United States Patent
Boggs et al.

(10) Patent No.: US 6,516,253 B2
(45) Date of Patent: Feb. 4, 2003

(54) ENGINE READY DETECTION USING CRANKSHAFT SPEED FEEDBACK

(75) Inventors: David Lee Boggs, Bloomfield Hills, MI (US); Stephen Richard Burke, Waterford, MI (US); Stephen John Kotre, Ann Arbor, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/729,872

(22) Filed: Dec. 5, 2000

(65) Prior Publication Data

US 2002/0068998 A1 Jun. 6, 2002

(51) Int. Cl.[7] .............................. B60K 6/04; B60K 1/00
(52) U.S. Cl. ........................ 701/20; 701/110; 123/436; 477/7
(58) Field of Search .................... 701/22, 110; 477/7, 477/20; 123/436

(56) References Cited

U.S. PATENT DOCUMENTS

| | | | | |
|---|---|---|---|---|
| 4,009,695 A | * | 3/1977 | Ule | 123/90.13 |
| 4,197,767 A | * | 4/1980 | Leung | 477/98 |
| 4,327,352 A | | 4/1982 | Cerruti | |
| 4,368,707 A | * | 1/1983 | Leshner et al. | 123/436 |
| 4,491,110 A | | 1/1985 | Bosch | |
| 5,027,775 A | | 7/1991 | Iwata | |
| 5,069,183 A | | 12/1991 | Nagano et al. | |
| 5,111,405 A | * | 5/1992 | Maeda et al. | 701/110 |
| 5,168,854 A | | 12/1992 | Hashimoto et al. | |
| 5,372,101 A | | 12/1994 | Hoshiba et al. | |
| 5,456,232 A | * | 10/1995 | Firey | 123/430 |
| 5,561,600 A | * | 10/1996 | McCombie | 123/436 |
| 5,601,058 A | | 2/1997 | Dyches et al. | |
| 5,862,507 A | * | 1/1999 | Wu et al. | 701/111 |
| 6,006,155 A | * | 12/1999 | Wu et al. | 701/111 |
| 6,009,369 A | | 12/1999 | Boisvert et al. | |
| 6,098,591 A | * | 8/2000 | Iwata | 123/339.11 |

FOREIGN PATENT DOCUMENTS

| | | |
|---|---|---|
| EP | 0979941 | 2/2000 |
| WO | WO 9605427 | 2/1996 |

OTHER PUBLICATIONS

Taraza, "Determination of the Gas–Pressure Torque of a Multi–cylinder Engine from Measurements of the Crankshaft's Speed Variation", SAE 980164 (1998).

* cited by examiner

Primary Examiner—William A. Cuchlinski, Jr.
Assistant Examiner—Olga Hernandez
(74) Attorney, Agent, or Firm—Foster Swift

(57) ABSTRACT

The present invention provides a method and system for determining "engine on" status in a Hybrid Electric Vehicle. A controller determines the engine is necessary and then checks the current "engine on" status. If the engine is not currently running, the controller proceeds to start the engine by commanding the generator to spin or "motor" the engine. The controller then starts fuel flow and spark within the engine to create combustion. A measuring device is then used to determine the crankshaft speed. The controller receives this measurement and determines whether the measured variations in crankshaft speed exceed a calibratable threshold. If the calibratable threshold is exceeded, combustion is determined to be occurring and the engine is on. The controller then turns on the "engine on" status flag.

5 Claims, 2 Drawing Sheets

ENGINE READY DETECTION USING CRANKSHAFT SPEED FEEDBACK

BACKGROUND OF THE INVENTION

1. Field of Invention

The present invention relates generally to a Hybrid Electric Vehicle (HEV), and specifically to an HEV system controller that determines "engine on" by measuring variations in crankshaft speed.

2. Discussion of the Prior Art

The need to reduce fossil fuel consumption and emissions in automobiles and other vehicles powered by an Internal Combustion Engine (ICE) is well known. Vehicles powered by electric motors attempt to address these needs. However, electric vehicles have limited range and limited power capabilities and need substantial time to recharge their batteries. An alternative solution is to combine both an ICE and electric traction motor into one vehicle. Such vehicles are typically called Hybrid Electric Vehicles (HEVs). See generally, U.S. Pat. No. 5,343,970 (Severinsky).

The HEV is described in a variety of configurations. Many HEV patents disclose systems in which an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A Parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE.

A Parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gearset transaxle. A first electric motor, the generator, is connected to a sun gear. The ICE is connected to a carrier. A second electric motor, a traction motor, is connected to a ring (output) gear via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used.

The desirability of combining an ICE with an electric motor is clear. The ICE's fuel consumption and emissions are reduced with no appreciable loss of vehicle performance or range. Nevertheless, there remains a substantial opportunity to develop ways to optimize HEV operation.

One such area of development is determining if the engine is on. In a conventional vehicle, "engine on" status can be easily determined after "key on" by comparing the actual engine speed to a threshold value that indicates the engine is producing torque and combustion. It can also be determined by simply listening for engine noise or feeling engine vibration. However, in an HEV the engine may not be running after "key on" and sometimes not even when the vehicle is in motion. Therefore, it becomes necessary for the Vehicle System Controller (VSC) to identify "engine on" status before making powertrain torque determinations.

The prior art has disclosed methods to determine the "engine on" status. Unfortunately, these methods often relate specifically to conventional ICE vehicles. For example, in U.S. Pat. No. 5,372,101 to Hoshiba, et al., engine speed is measured to determine if the engine is starting or running. This method does not work with an HEV because the HEV's generator can spin the engine, thus producing engine speed without combustion occurring. Therefore, engine speed in this situation is not a reliable measurement of "engine on" status in a HEV.

In U.S. Pat. No. 5,601,058 to Dyches, et al., a method of measuring starter motor current is disclosed and in U.S. Pat. No. 6,009,369 to Boisurart, et al., a method of measuring alternator voltage is disclosed to determine if the engine is running. These two methods are also inapplicable to the HEV because the HEV does not use a conventional starter motor or alternator.

Therefore, it is necessary to develop a way for the VSC to determine "engine on" status in HEVs before allowing engine torque request.

SUMMARY OF THE INVENTION

Accordingly, the present invention provides a method and system for determining the "engine on" status in an HEV.

The HEV relies upon the generator motor to spin up or "motor" the engine. Therefore, it is not possible to measure engine speed to determine whether the engine is running. It is an object of the present invention to provide a reliable method to determine "engine on" status in an HEV by measuring variations in crankshaft speed. The Vehicle System Controller (VSC) monitors engine speed in a conventional manner known in the prior art (e.g., Hall Effect sensor), but rather than using absolute engine speed to determine engine status, the VSC looks for engine speed variations caused by the periodic nature of the combustion process in an IC engine. D. Taraza, et al, in *Determination of the Gas-Pressure Torque of a Multicylinder Engine from Measurements of the Crankshaft's Speed Variation*, SAE 980164 (1998), performs a discrete Fourier transform on the crank speed signal, then uses the amplitude of the $3^{rd}$ harmonic to determine engine torque. This invention does not need to go as far as predicting exact torque, only the difference between a motoring engine and a "running" engine. A motoring engine will have very little speed variation because electric motors have a very smooth torque output. Once the VSC determines the engine is running, it can allow engine torque requests.

A system to perform the above method comprises a controller, an engine, a generator, and measuring device to determine crankshaft speed. The controller determines the need for the engine to be on, starts the engine, and then determines "engine on" status by comparing crankshaft speed variation to a calibratable threshold.

DETAILED DESCRIPTION OF THE PREFERRED EMBODIMENT

Figure 1:
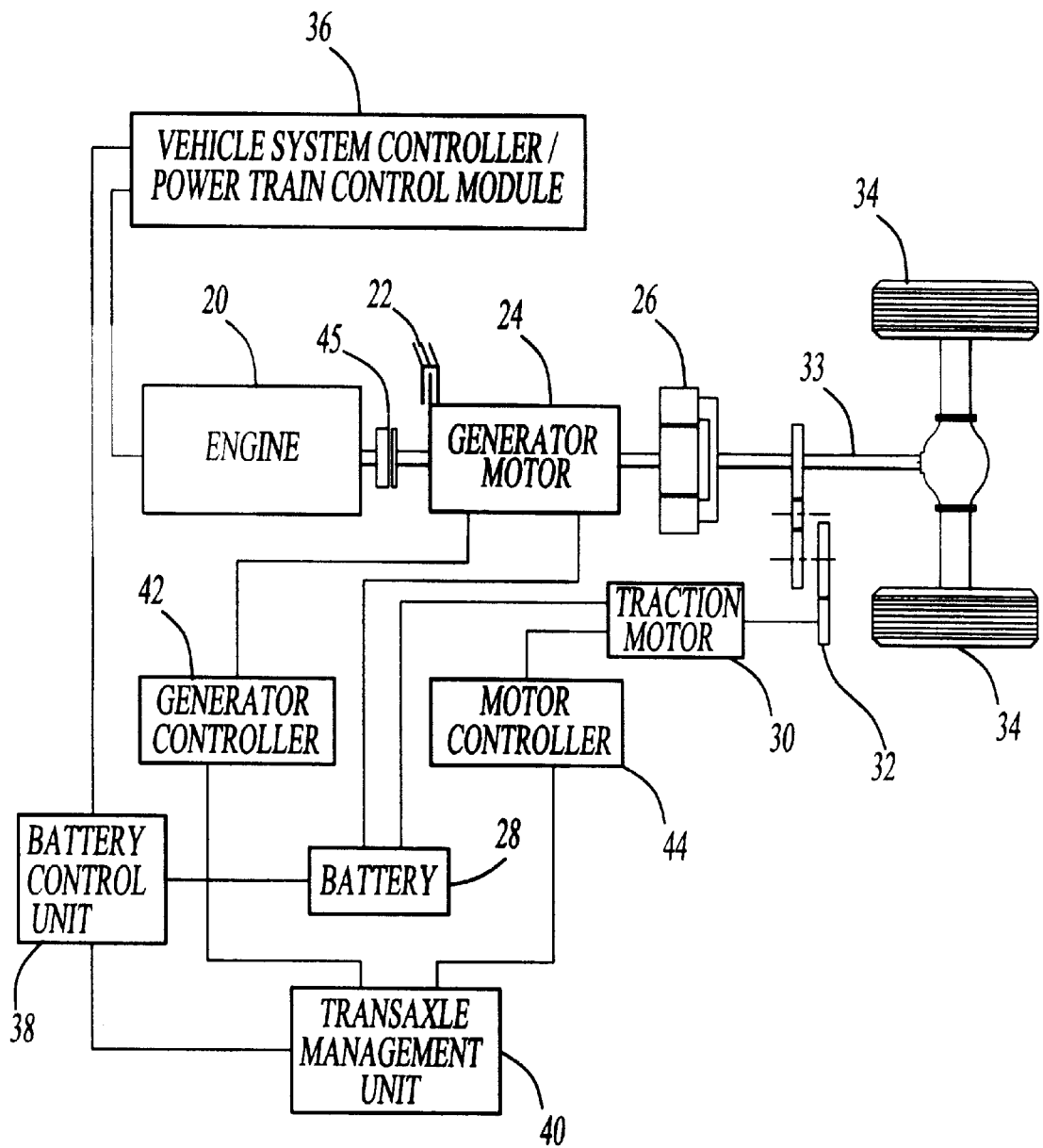
FIG. 1 illustrates a general Hybrid Electric Vehicle configuration.

The present invention relates to Electric Vehicles and, more particularly, Hybrid Electric Vehicles (HEV). FIG. 1 demonstrates just one possible configuration, specifically a Parallel/Series Hybrid Electric Vehicle (powersplit) configuration.

In this HEV configuration, a Planetary Gear Set 26 mechanically couples a carrier gear to an Engine 20 via a One Way Clutch 45. The Planetary Gear Set 26 also mechanically couples a sun gear to a Generator Motor 24 and a ring (output) gear to a Traction Motor 30. The Generator Motor 24 also mechanically links to a Generator Brake 22 and is electrically linked to a Battery 28. The Traction Motor 30 is mechanically coupled to the ring gear of the Planetary Gear Set 26 via a Second Gear Set 32 and is electrically linked to the Battery 28. The ring gear of the Planetary Gear Set 26 is mechanically coupled to Drive Wheels 34 via an Output Shaft 33.

The Planetary Gear Set 26, splits the Engine 20 output energy into a series path from the Engine 20 to the Generator Motor 24 and a parallel path from the Engine 20 to the Drive Wheels 34. Engine 20 speed can be controlled by varying the split to the series path while maintaining the mechanical connection through the parallel path.

The Traction Motor 30 augments the Engine 20 power to the Drive Wheels 34 on the parallel path through the Second Gear Set 32. The Traction Motor 30 also provides the opportunity to use energy directly from the series path, essentially running off power created by the Generator Motor 24, thereby reducing losses associated with converting energy into and out of chemical energy in the Battery 28.

A Vehicle System Controller (VSC) 36 controls many components in this configuration. The VSC 36 operates all the vehicle's main components by connecting to each component's controllers. In this illustrative embodiment, the VSC 36 also contains a Powertrain Control Module (PCM). The VSC and the PCM, though housed in the same unit in this illustrative embodiment, are actually separate controllers and can be housed in their own modules.

The VSC 36 connects to the Engine 20 via a hardwire interface. The VSC 36 is also connected to a Battery Control Unit (BCU) 38, and a Transaxle Management Unit (TMU) 40 through a Communication Network (Controller Area Network, or CAN, for example). The BCU 38 is then connected to the Battery 28 via a hardwire interface. The TMU 40 controls the Generator Motor 24 and Traction Motor 30 via the hardwire interface.

The VSC 36 determines the required Drive Wheel 34 or Output Shaft 33 torque and makes appropriate Engine 20 and Motor 30 torque requests. Involving the Engine 20 in the delivery of the desired Drive Wheel 34 or Output Shaft 33 torque requires the engine to be on and making combustion. Therefore, the VSC 36 must know if the Engine 20 is on and combusting before the torque request is made. Since the Engine 20 is not always on, a method to determine "engine on" status is needed.

Figure 2:
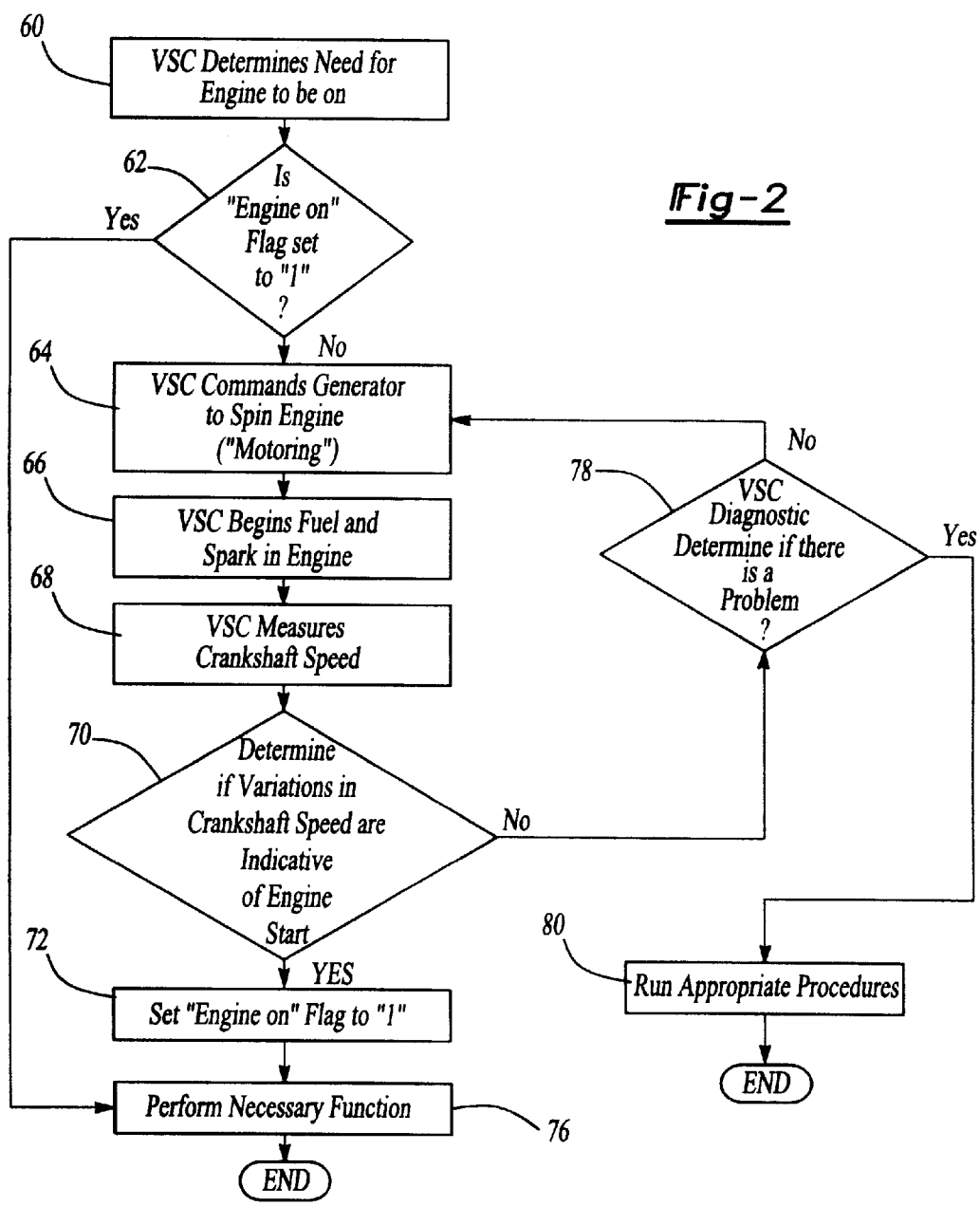
FIG. 2 illustrates a flow chart demonstrating the controller process.

The present invention addresses this need and provides the VSC 36 with the way to determine "engine on" status before the VSC 36 makes the torque request. FIG. 2 is a flow diagram demonstrating how the VSC 36 determines "engine on" status. At Step 60, the VSC 36 determines the Engine 20 is needed.

At Step 62, the VSC 36 checks the "engine on" status flag in its logic. If the flag is set to "1," the Engine 20 is already running and the VSC can proceed to Step 76 and perform the necessary function (i.e., make the Engine 20 torque request).

If the "engine on" flag is set to "0," indicating the Engine 20 is not on, the VSC 36 must start the Engine 20 before proceeding.

At Step 64, the VSC 36 commands the Generator Motor 24 to turnover the Engine 20, commonly referred to as "motoring." The VSC 36 then begins Engine 20 fueling and sparking at Step 66 to facilitate Engine 20 combustion. At Step 68, the VSC measures the variations in crankshaft speed.

After the variations in crankshaft speed are measured, the VSC 36 determines if the value indicates the Engine 20 has started and is making combustion at Step 70. Variations in crankshaft speed are due to the attending torque pulses on the engine crankshaft (i.e., positive torque during a piston power stroke and negative torque during a piston compression stroke). Engine 20 speed variations are reduced in magnitude if combustion is not occurring. Higher levels of engine speed variation indicate combustion is occurring and the engine is on.

If the variations in crankshaft speed meet the threshold requirements, the VSC 36 determines combustion is occurring and the "engine on" flag is set to "1" at Step 72. The VSC then performs its normal and necessary function at Step 76 of partitioning a portion of the desired Drive Wheel 34 or Output Shaft 33 torque request to the engine and electric motors.

If the variations in crankshaft speed do not indicate combustion at 70, the VSC diagnostics determine at Step 78 if any problems exist, such as generator failure. If no problems are detected, the VSC continues to attempt engine start by returning to Step 64. If a problem is detected, the VSC runs its appropriate procedures at 80.

We claim:

1. A method of determining a vehicle "engine on" status comprising:

measuring crankshaft speed;

determining a variation in crankshaft speed;

comparing variation in crankshaft speed to a calibratable threshold;

determining if combustion is occuring.

2. The method of claim 1 wherein the vehicle is a Hybrid Electric Vehicle.

3. The method of claim 1 wherein a controller receives the measured crankshaft speed and compares the measured crankshaft speed variations to the calibratable threshold to determine if combustion is occurring.

4. The method of claim 1 further comprising the step of turning on an "engine on" status flag if the measured crankshaft speed variation exceeds the calibratable threshold.

5. A system to determine "engine on" status in a Hybrid Electric Vehicle comprising:

a controller;

a generator;

an engine; and a measuring device to determine crankshaft speed, wherein the controller starts the engine with a command to the generator to spin up the engine, and a command to start fuel flow to the engine and sparking within the engine.

* * * * *